Patented June 5, 1934

1,962,077

UNITED STATES PATENT OFFICE 1,962,077

PROCESS OF MAKING PYROXYLIN TUBING

Herman Kaufman, Bellmore, N. Y., assignor to Dupont Viscoloid Company, Wilmington, Del., a corporation of Delaware No Drawing. Application December 31, 1930, Serial No. 505,955

5 Claims. (Cl. 18—51)

This invention relates to the manufacture of pyroxylin tubing by winding strips of pyroxylin sheet material in spiral form into tubing.

Instead of making pyroxylin tubing out of soft pyroxylin material by pressing it through dies in a stuffer, I take seasoned pyroxylin sheets, cut them into strips and wind each strip in spiral form upon a drill rod, or mandrel, or stick; I heat and then cool this spiral tubing so it will keep its form. I then apply pyroxylin cement, or alcohol, or acetone, or any other kind of pyroxylin solvent to cement this spirally wound strip together and thus I obtain a solid pyroxylin tube.

I claim:

1. In the production of tubing by that method that comprises spirally winding a strip of thermoplastic material about a temporary mandrel unattached to the strip and cementing the edges of the wound strip together to form the tube, the steps of heating the material and cooling the wound heated strip whereby to set the strip in spiral form to prepare it for cementing, and then cementing the strip while in its cold, spiral-set condition.

2. In the production of tubing by that method that comprises spirally winding a strip of thermoplastic material about a temporary mandrel unattached to the strip, and cementing the edges of the wound strip together to form the tube, the steps of heating the material and cooling the wound heated strip whereby to set the strip in spiral form to prepare it for uniting, and then uniting the strip by means of solvent while in its cold, spiral-set condition.

3. In the production of tubing by that method that comprises spirally winding a strip of thermoplastic material about a temporary mandrel unattached to the strip and cementing the edges of the wound strip together to form the tube, the steps of heating the material and cooling the wound heated strip whereby to set the strip in spiral form to prepare it for uniting, and then uniting the strip by means of acetone while in its cold, spiral-set condition.

4. In the production of tubing by that method that comprises spirally winding a strip of cellulose derivative plastic material about a temporary mandrel unattached to the strip and cementing the edges of the wound strip together forming a tube, the steps of cooling the wound heated strip whereby to set the strip in spiral form to prepare it for cementing and then cementing the strip while in its cold spiral-set condition.

5. In the production of tubing by that method that comprises spirally winding a strip of pyroxylin material about a temporary mandrel unattached to the strip and cementing the edges of the wound strip together forming a tube, the steps of cooling the wound heated strip whereby to set the strip in spiral form to prepare it for cementing and then cementing the strip while in its cold spiral-set condition.

HERMAN KAUFMAN.